A. STONER.
Tire-Tightener
No. 16,408. Patented Jan. 13, 1857.
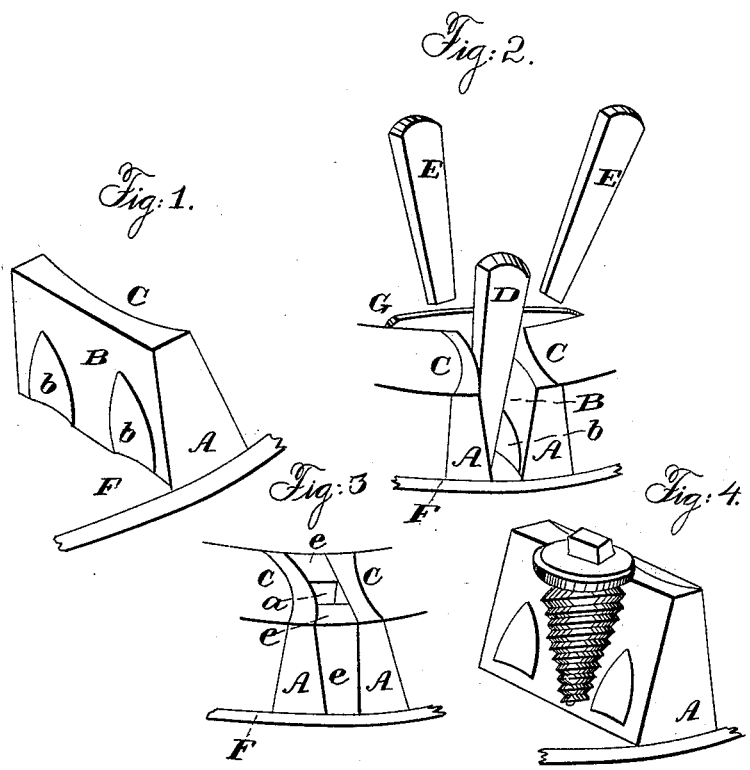

UNITED STATES PATENT OFFICE.

AUGUSTUS STONER, OF MOUNT JOY, PENNSYLVANIA.

MODE OF TIGHTENING FELLIES IN WHEELS.

Specification of Letters Patent No. 16,408, dated January 13, 1857.

*To all whom it may concern:*

Be it known that I, AUGUSTUS STONER, of the borough of Mount Joy, Lancaster county, and State of Pennsylvania, have invented a new Device or Method for Tightening Fellies in the Wheels of Carriages, Wagons, &c.; and I do hereby declare that the following is a full and exact description and mode of applying, reference being had to the annexed drawings, making a part of this specification, in which—

Figure 1 represents one of the two cheeks used, of the height and width of the fellies intended to be tightened.

B is the inside or face, having on each side at $b$, $b$, a piece gouged out at the bottom or base resting on the tire F.

C, is the concave side next the wood into which the fellies are fitted and thereby retained.

A, shows the side, narrow at top and wider at the base, which forms the dovetail cheeks. When two such cheeks are in place, they may be cast in one matrix, of zinc or other metal. When the opening between the shrunken fellies will not admit both cheeks the wood is removed so as to admit the cheeks between them, which rest on the tire of the wheel. By means of a pair of wedges E E, Fig. 2, or a screw nut, as at Fig. 4, the cheeks are forced apart, thereby tightening the fellies. When done, by means of a center wedge D, Fig. 2, the side wedges are removed and their place filled in with molten spelter, lead or any compound, simply by applying a piece of stiff leather G, Fig. 2 on the outside A, A, which prevents the metal from running out till set, after which the wedge D is also removed like at Fig. 3, and its place filled in, are simply plugged up. Should the fellies shrink thereafter so as to loosen the cheek by laying bits of leather between them next the wood they can be again made tight without a new pair of cheeks.

What I claim as new and desire to secure by Letters Patent is—

1. I claim the construction and operation of the metallic cheeks A, Fig. 1, when constructed as described.

2. I also claim the manner of securing them in their place when applied to the fellies of wheels by the use of melted metal of any kind filling the grooves $b$, $b$ to keep them secure in their place substantially in the manner and for the purpose set forth.

I do not claim the wedges or keys E, E, as my invention.

AUGUSTUS STONER.

Witnesses:
 JOHN DAVIS,
 JACOB MUMMA.